Oct. 21, 1952   C. STEFFEN   2,614,454
PROCESS FOR RENDERING VISIBLE THE STEREOMETRICAL (SPATIAL)
STRUCTURE OF OBJECTS, AND IN PARTICULAR FOR PREPARATIONS
FOR HISTOLOGICAL INVESTIGATIONS
Filed June 5, 1948
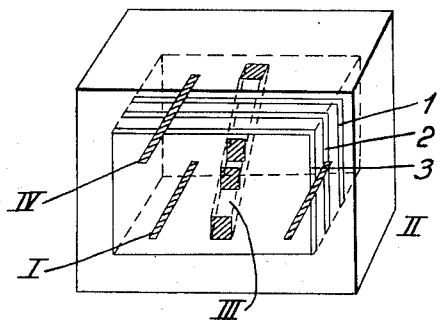
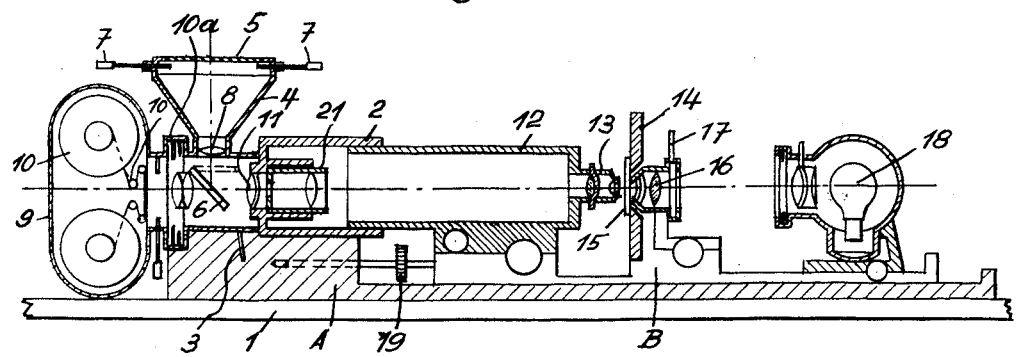
INVENTOR.
Carl Steffen
BY Patented Oct. 21, 1952

2,614,454

UNITED STATES PATENT OFFICE 2,614,454

PROCESS FOR RENDERING VISIBLE THE STEREOMETRICAL (SPATIAL) STRUCTURE OF OBJECTS, AND IN PARTICULAR FOR PREPARATIONS FOR HISTOLOGICAL INVESTIGATIONS

Carl Steffen, Vienna, Austria

Application June 5, 1948, Serial No. 31,364
In Austria June 10, 1947

2 Claims. (Cl. 88—16)

The present invention relates to a process for rendering visible the stereometrical spatial structure of objects. In particular the invention relates to a process for rendering visible the internal structure of an object prepared for histological investigation.

It is an object of the present invention to prepare a film by means of which the internal structural characteristics of any tissue can be demonstrated, in such a manner that different frames of a motion picture film will each have pictures thereon of transversal slices of the object to be investigated, each slice being taken a short distance from the next succeeding slice along the longitudinal direction of the object.

It is a further object of the invention to provide means whereby the pictures of the slices will be accurately centered on each frame of the motion picture.

With the above objects in view the present invention mainly consists of a method of preparing a film representing the accurately centered course of the internal structure of an object to be examined. A specimen is sliced, together with indicating means for securing accurate centering into successive individual sections, in such a way, that each individual section represents a cross section of the internal structure of said object in the plane of division. The slices are then photographed, centered according to their original internal structure by the respective cross sectional parts of said indicating means, appearing individually and in succession on successive frames of a motion picture film.

According to the present state of the histological technique the microscopic picture of a tissue is obtained in the following manner:

A piece of tissue to be investigated is fixed and is—after freezing up or embedding in paraffine (celloidine)—sliced into microscopic sections by means of a microtome. The individual sections are located on a slide, stained according to various methods and finally examined through the microscope.

This way the investigator obtains a cross section of the internal structure of said tissue. If he desires to study the spatial conditions of the internal structure of an object to be investigated, he has to examine a series of sections with one section after another, so as to draw conclusions on the spatial conditions by comparing the different sections.

This method is complicated and tedious, and does not demonstrate the topographical connections. It is difficult to conceive in this manner an adequate image of the spatial connections of the internal structure and models and diagrams must additionally be resorted to.

Experiments to take from a section-ribbon, that is a continuous band of successive, edgewise adhering microscopic sections, each successive section on a film negative did not meet with much success, since the different sections could not be exactly centered one upon another on the film negative and were apt to be relatively displaced more or less.

According to the present invention, the demonstration of the internal structural characteristics of any tissue is obtained by taking on a film negative sections through an object thus prepared, while each individual section from said object possesses registering marks for centered photography.

The method consists in slicing an homogenous object for scientific investigation together with attached centering devices, for example hairs embedded together within the object, said hairs being perpendicularly arranged to the direction of cutting. Each individually obtained section representing the internal structure of said object in the place of division shows the same cross-section images of said centering devices as marks for their centered photography. After slicing, the individual sections may be prepared according to any method suitable for an illustration of the structure of said sections.

In comparison to animated motion pictures the substantial difference obtaining the components to be photographed is the layerwise slicing up of an homogenous object together with attached centering devices for the purpose of rendering visible its internal structural characteristics, and that the arrangement of the individual sections or layers, or of their illustrations is, with the above end in view, carried out in such a manner, that at the cinematographic representation a motion is only shown or made visible as caused by the changes of the internal structural characteristics of said object.

For special investigations, sections or layers of an object may—in correct spatial sequence—be also photographed on a sensitized plate, with the cross sections of the centering devices coinciding on the sensitized plate, whereby the variations of the structure are rendered perceptible on the negative in a manner similar to that of a technical drawing.

It goes without saying, that it is not necessary to take only photographs of the real sections. Illustrations showing the respective cross-sec tions may be used as substitute and may just as well render visible the internal structural connections by the way of the principle described above.

The Figures 1 and 2 of the drawing illustrates the invention by way of examples. Fig. 1 explains the invention diagrammatically by showing internal characteristics of an object to be investigated together with indicating means prior to the division together with their correlations after a division in three individual sections.

Fig. 2 shows a device for executing the claimed method, said device being composed of a horizontally disposed microscopic part and a vertically located centering unit in connection with the casing for the film negative.

Fig. 1 is a diagram explaining the method of the invention. In the prismatic block I of the embedding mass the homogenous object II, in which the internal part III is to be spatially represented, is perforated by three channels IV, located vertically to the cut. In each of the individual sections 1, 2, 3, the three channels IV will appear as three points invariably positioned in respect to each other, which seen on a focusing screen will as described hereinafter, render possible the centering of the individual sections on a cinematographic negative film corresponding to their internal spatial structure.

The individual sections for the purpose of taking their centered photos, with the aid of a device for executing this method diagrammatically shown in Fig. 2, are fastened to the section holder 14 in front of the horizontally disposed microscopic part of said device, composed of the objective 13, the shiftable part of the microscope tube 12 with the drive 19, the immovable eyepiece part of the microscope tube 2 and the eyepiece 21. The light coming from light-source 18 at the right, condensed by the condensor 16 provided with the aperture diaphragm 17 passes the cross-section of the object 15 and enters the objective 13 of the microscope. An image of the section by the objective 13 and the eyepiece 21 of the microscope produced on the tiltable mirror 6 is reflected by said mirror, when tilted down, through the projection lens 8 of the centering unit 4 on the focusing screen 5.

The cross-sections of the channels IV (Fig. 1) of the first section through the block 1 (Fig. 1) will be seen together with the cross section of the internal structural characteristics of the object on said focusing screen and will be fixed by drawing or by adjustment of the shiftable pins 7 on said focusing screen. As soon as the mirror 6 is tilted up the image of the first cross-section corresponding to the former adjustment on the focusing screen can be taken on the negative film 10 placed in the casing 9 by opening the shutter 10a.

The internal structural characteristics of each successive section will be seen on the focusing screen together with the marks of the channels IV from the first section. The succeeding sections will be shifted with the help of the section holding unit 14 until their cross sections of said channels coincide with the cross section marks of said channels on the focusing screen. By this means the succeeding section is accurately centered entirely on the same spot as its predecessor and can be photographed with the cinematographic camera.

According to this method all sections through an object representing the internal structure of said object in the place of division are readily investigated, when taken in properly centered manner in conformity with the original spatial sequence of their internal structure, image by image on a series of succeeding frames of a negative film and may then as a whole be cinematographically represented.

The method is not only confined to rendering visible the internal structural characteristics of objects divisible in transparent individual sections, but may be extended to all bodies cuttable, dividable, or layerwise grindable whose internal structure is of interest to be investigated in its spatial sequence.

What I claim is:

1. A method for preparation of a film representing the accurate centered course of the internal structure of an object to be examined for histological investigations, which consists in applying to said object before dividing indicating means for securing accurate centering, dividing the latter object together with the indicating means into successive individual sections in such a way, that each individual section representing a cross section of the internal structure of said object together with a cross section of said indicating means in the plane of division is suitable for microscopic investigation, and photographing said sections with their internal structure centered by the respective cross sectional portions of said indicating means in succession on the different frames of a motion picture film.

2. A method of preparing a cinematographic film representing the accurate centered course of the internal structure of an object, comprising the steps of applying to said object indicating means for accurate centering; thereafter dividing said object together with said indicating means into successive, individual sections in such a manner that each individual section represents a cross section of the internal structure of said object together with a cross section of said indicating means in the plane of division; and photographing said individual sections with their internal structure centered by the respective cross sections of said indicating means individually and in succession on successive frames of a cinematographic film.

CARL STEFFEN.

REFERENCES CITED

The following references are of record in the file of this patent:

UNITED STATES PATENTS

| Number | Name | Date |
|---|---|---|
| 1,169,843 | Low | Feb. 1, 1916 |
| 1,470,770 | Siedentopf | Oct. 16, 1923 |
| 1,625,952 | Lucas | Apr. 26, 1927 |
| 1,971,722 | Mann | Aug. 28, 1934 |
| 2,185,926 | Senecal | Jan. 2, 1940 |
| 2,425,929 | Foster | Aug. 19, 1947 |
| 2,444,729 | Crockwell | July 6, 1948 |

FOREIGN PATENTS

| Number | Country | Date |
|---|---|---|
| 606,527 | Germany | Dec. 4, 1934 |
| 147,911 | Austria | Nov. 25, 1936 |